March 11, 1952
J. LUDI
2,588,737
POULTRY FEEDER AND WATERER
Filed Sept. 21, 1950
3 Sheets-Sheet 1
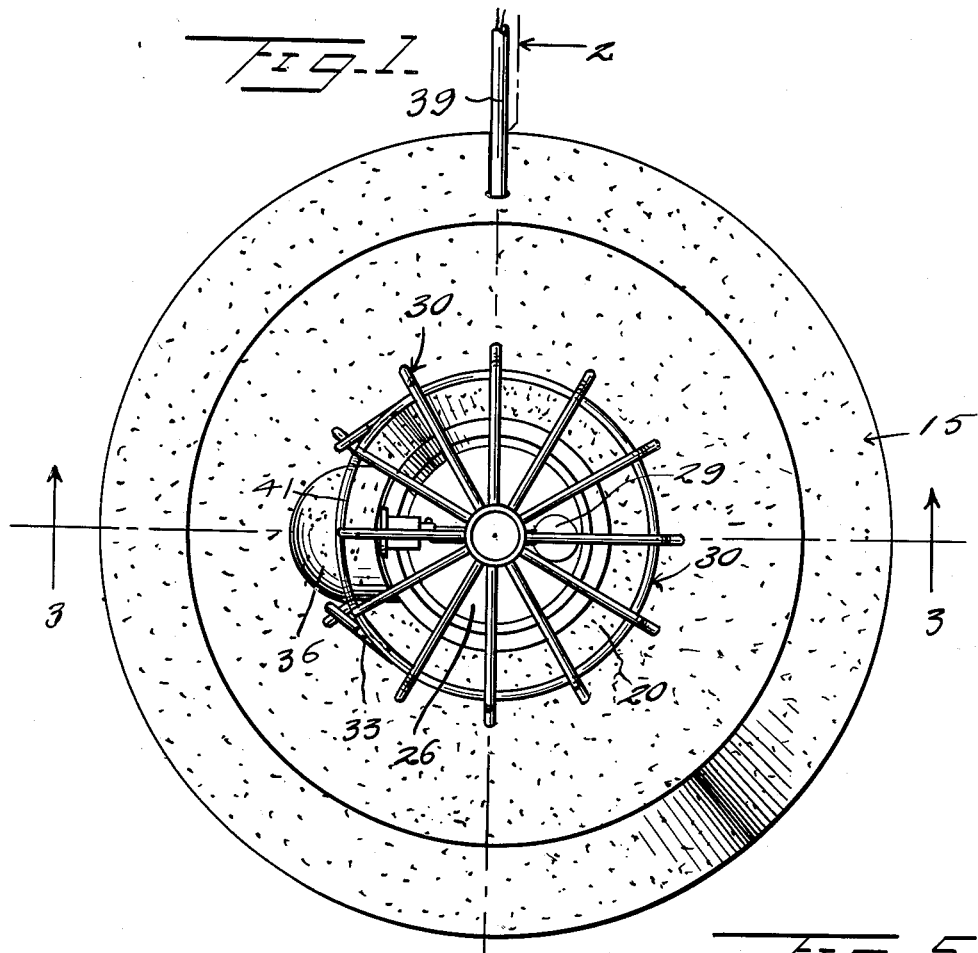
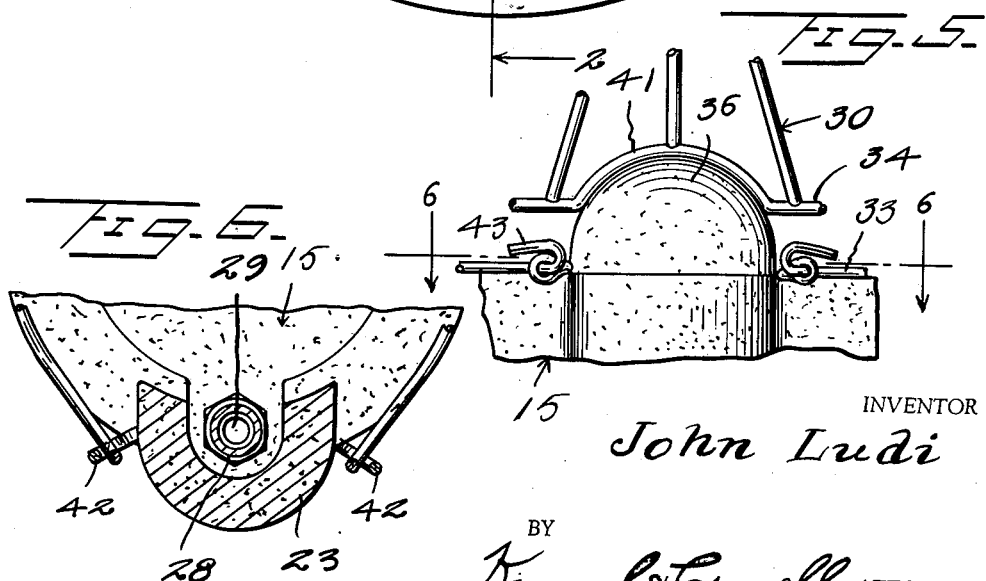
INVENTOR
John Ludi
BY
Kimmel & Crowell ATTORNEYS

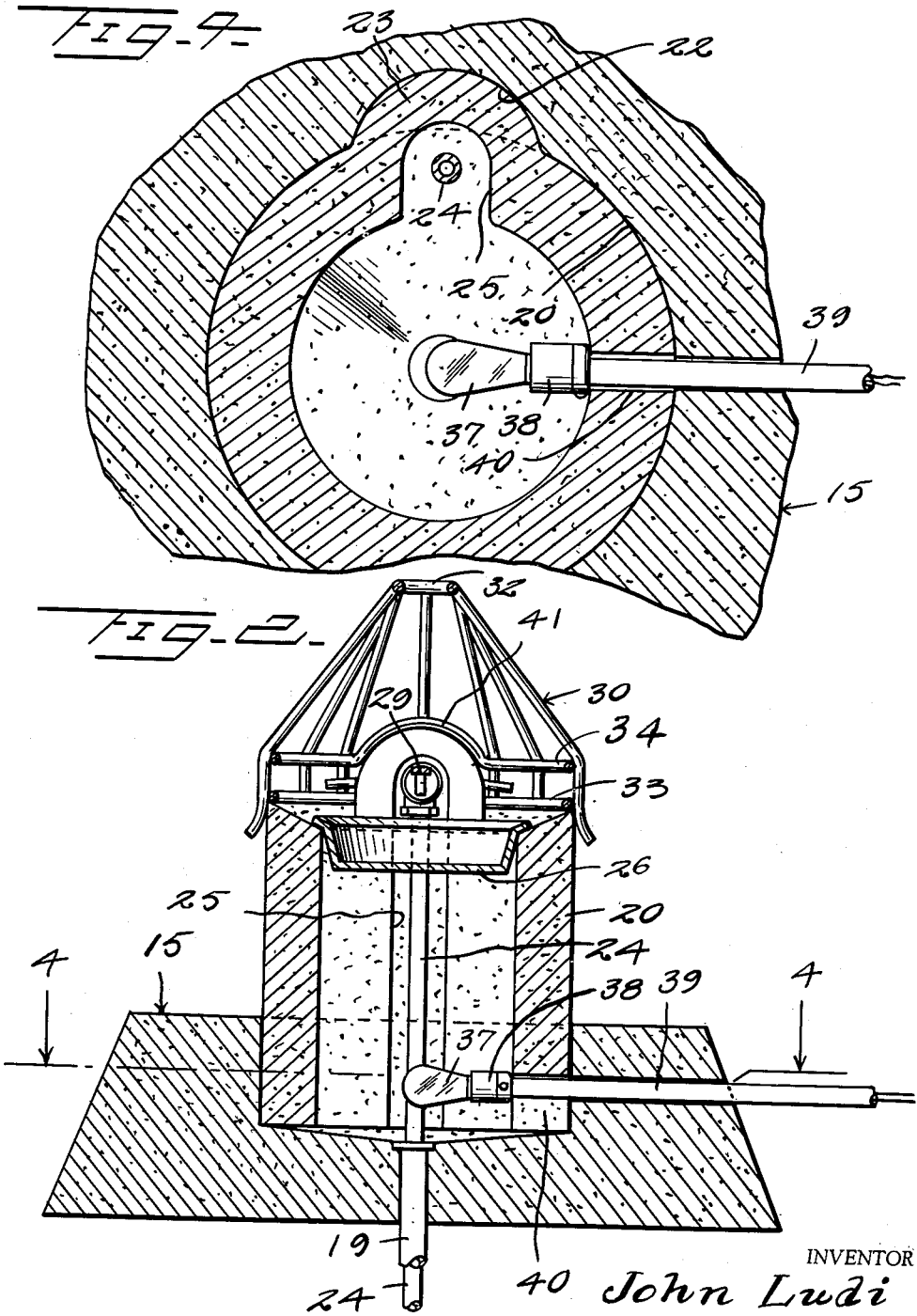

March 11, 1952 J. LUDI 2,588,737
POULTRY FEEDER AND WATERER
Filed Sept. 21, 1950 3 Sheets-Sheet 3

INVENTOR
John Ludi

BY
Kimmel & Crowell ATTORNEYS

Patented Mar. 11, 1952

2,588,737

UNITED STATES PATENT OFFICE 2,588,737

POULTRY FEEDER AND WATERER

John Ludi, Toms River, N. J.

Application September 21, 1950, Serial No. 186,058

1 Claim. (Cl. 119—73)

This invention relates to a poultry watering and feeding device.

An object of this invention is to provide a poultry watering device which includes float operated means for maintaining a supply of water with a guard about the water supply to keep the water clean.

Another object of this invention is to provide a fountain or watering device for poultry which includes a concrete base having a drain through the bottom thereof, and a removable upright cylinder for supporting the water pan with a guard engaging over the upper end of the cylinder.

A further object of this invention is to provide a poultry watering device which includes means for heating the water to keep it from freezing.

With the above and other objects in view, my invention consists in the arrangement, combination and details of construction disclosed in the drawings and specification, and then more particularly pointed out in the appended claims.

In the drawings:

Figure 1 is a plan view of a poultry watering device constructed according to an embodiment of this invention.

Figure 2 is a sectional view taken on the line 2—2 of Figure 1.

Figure 4 is an enlarged fragmentary sectional view taken on the line 4—4 of Figure 2.

Figure 5 is an enlarged fragmentary rear elevation of the upper portion of the device.

Figure 6 is an enlarged fragmentary sectional view taken on the line 6—6 of Figure 5.

Figure 3:
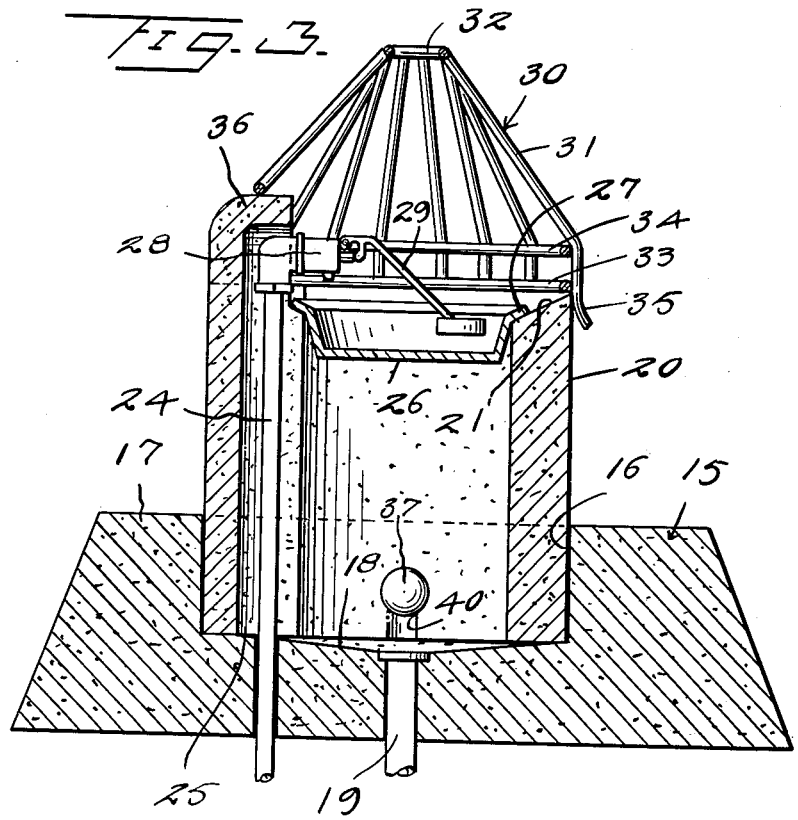
Figure 3 is a sectional view taken on the line 3—3 of Figure 1.

Referring to the drawings, the numeral 15 designates generally a base member which may be formed out of concrete or the like and has a substantially frustro-conical configuration. The base member 15 is provided with a socket or opening 16 extending downwardly from the upper side 17 thereof, and the bottom of the socket 16 tapers inwardly as indicated at 18 to the center so that water flowing onto the bottom 18 will drain into a drain or outlet pipe 19. A cylindrical member 20 removably engages within the socket 16 and is provided with an inwardly inclined upper edge 21 for draining any water which may be spilled on the upper edge of member 20 into the interior of the base 15. The base 15 is formed with an arcuate vertically extending keyway 22, and the cylindrical member 20 is formed with a transversely arcuate key 23 which is engageable within the keyway 22 so as to hold the cylindrical member 20 against turning about the vertical axis thereof. The key 23 also provides an extension of the cylindrical member 20 for engagement about a vertically disposed water supply pipe 24 which extends upwardly from the base 15.

The cylindrical member 20 is formed with a vertically extending and inwardly opening slot 25 within which the pipe 24 loosely engages. A water supply pan 26 is adapted to have the rim 27 thereof engaged with the upper end of the cylindrical member 20, and water is automatically discharged into the pan 26 through a float valve 28. A float 29 extends from the float valve 28 and is adapted to project into the upper open side of the pan 26 so as to automatically regulate the amount of water normally engaged within the pan 26.

A wire guard generally designated as 30 engages over the upper end of the cylindrical member 20 and is formed of a plurality of upwardly convergent bars 31 which are secured at their upper ends to a ring 32. The lower portions of the bars 31 are also secured to a lower bar 33 and to an intermediate bar 34.

Certain ones of the bars 31 are projected downwardly below the lower ring 33 so as to provide an outwardly flared retaining member 35. The upper end of the pipe 24 and the valve 28 are normally covered by means of a hood 36 which may be formed integral with the cylindrical member 20 and extend over the upper end of the slot or passage 25. A light bulb 37 is disposed in the lower portion of the cylindrical member 20 below the pan 26 being mounted in a socket 38 which is carried by an electric conduit 39. The conduit 39 projects through the base 15 and into the socket 38.

The cylindrical member 20 is formed with a slot 40 in the lower edge thereof for engagement over the inner end of the conduit 39 so that the lower end of the cylindrical member 20 will normally rest on the bottom of the socket 16. At the point where the intermediate ring 34 engages over the hood 36 ring 34 is upwardly offset as indicated at 41 and the guard 30 is hingedly secured to the cylindrical member 20 by means of a pair of eyes 42 which project radially outwardly adjacent the upper end of the offset 23, and the lower ring 33 is split and then extended through the eyes 42 and bent forwardly as indicated at 43.

What is claimed is:

A poultry watering device comprising a frustro-conical concrete base having a centrally disposed recess opening through the top thereof, said base having a vertically disposed keyway opening into said recess, a cylindrical support seated at its lower end in said recess, a vertical key carried by said support engaging in said keyway, said support and key projecting above the top of said base, said support having a vertical channel opening inwardly of said support and disposed in the vertical plane of said key, a pan seated on the upper end of said support, a vertical water supply pipe in said channel, a float valve on the upper end of said pipe having a portion thereof projecting into said pan, said valve discharging water into said pan, a dome-shaped cap on the upper end of said key and support and engaging over said valve, a substantially conical wire guard on the upper end of said support, and a heating means in said support below said pan.

JOHN LUDI.

REFERENCES CITED

The following references are of record in the file of this patent:

UNITED STATES PATENTS

| Number | Name | Date |
| --- | --- | --- |
| 697,343 | Lathrop | Apr. 8, 1902 |
| 1,726,059 | Conner | Aug. 27, 1929 |
| 1,816,781 | Johnston | July 28, 1931 |
| 1,862,217 | Gay et al. | June 7, 1932 |